No. 677,977. Patented July 9, 1901.
I. N. GRAHAM, W. C. CRAIG & G. W. SHINAULT.
CUTTER BAR FOR HARVESTERS OR MOWERS.
(Application filed Apr. 11, 1901.)
(No Model.)
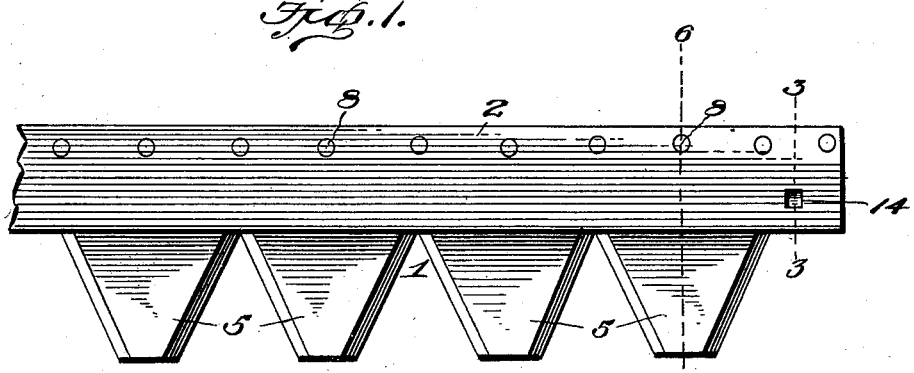
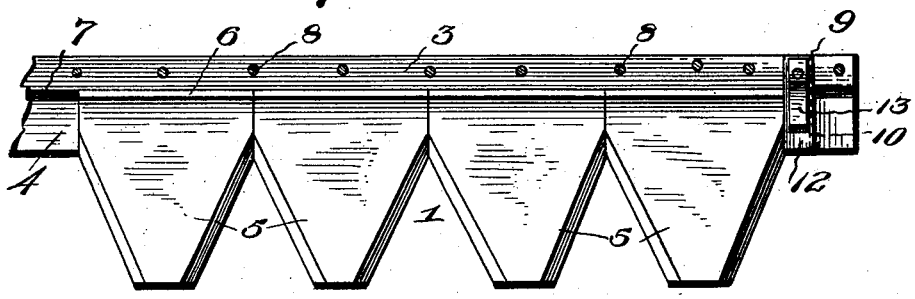
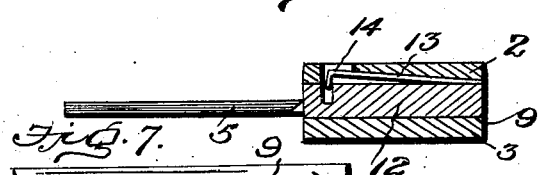
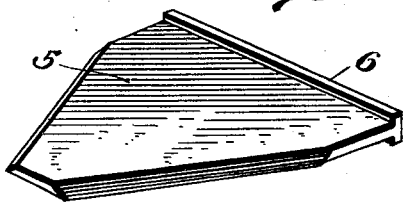
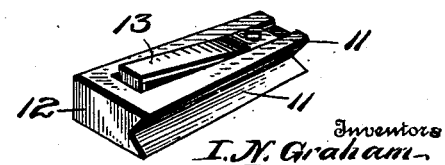
Witnesses
Inventors
I. N. Graham
W. C. Craig
G. W. Shinault
By
Attorneys

UNITED STATES PATENT OFFICE.

ISAAC N. GRAHAM, WILLIAM C. CRAIG, AND GEORGE W. SHINAULT, OF DEERFIELD, VIRGINIA.

CUTTER-BAR FOR HARVESTERS OR MOWERS.

SPECIFICATION forming part of Letters Patent No. 677,977, dated July 9, 1901.

Application filed April 11, 1901. Serial No. 55,357. (No model.)

*To all whom it may concern:*

Be it known that we, ISAAC N. GRAHAM, WILLIAM C. CRAIG, and GEORGE W. SHINAULT, citizens of the United States, residing at Deerfield, in the county of Augusta and State of Virginia, have invented certain new and useful Improvements in Cutter-Bars for Harvesters or Mowers; and we do declare the following to be a full, clear, and exact description of the invention, such as will enable others skilled in the art to which it appertains to make and use the same.

This invention relates to cutter-bars for harvesters and mowers, and has for its object to provide a construction wherein the cutting knives or blades are mounted in such manner as to be readily inserted and withdrawn from the bar for purposes of sharpening, repairs, and the substitution of new knives or blades for those injured to such an extent as to be unfit for further use.

The invention consists in certain novel features of construction, combination, and arrangement of parts, as will be hereinafter more fully described, and particularly set forth in the appended claim.

In the accompanying drawings, Figure 1 is a top plan view of a cutter-bar constructed in accordance with our invention. Fig. 2 is a similar view showing the upper blade of the bar removed. Fig. 3 is a cross-section through the bar on the line 3 3 of Fig. 1. Fig. 4 is a perspective view of one of the knives or blades. Fig. 5 is a similar view of the key. Fig. 6 is a cross-section through the bar on line 6 6 of Fig. 1, and Fig. 7 is a view of the end of the cutter-bar with the key in position.

Referring now more particularly to the drawings, the numeral 1 represents the cutter-bar, which is composed of corresponding upper and lower plates or members 2 and 3. These plates or members contact at their rear edges and are reduced on their under sides to form a longitudinal slot or chamber 4 for the reception of the knives or cutters 5.

The knives or cutters 5 are separate and independent—that is, they are not connected with each other, but may be independently applied and removed—and each is formed at its rear edge with flanges 6 to engage corresponding grooves 7, formed in the meeting surfaces of the top and bottom plates 2 and 3 at the rear of the slot or chamber 4. These flanges are slidably fitted in said grooves and serve to retain the knives or cutters in position against outward movement in a forward direction, as will be readily understood.

The top and bottom plates 2 and 3 may be secured together at their rear edges in any approved manner, but preferably by rivets 8, arranged at suitable intervals. The slot or chamber 4 opens through one end of the cutter-bar, but terminates short of the other end thereof, and at said latter end the said top and bottom plates or members of the bar are connected by riveting or otherwise to hold them rigidly secured. Intersecting the slot or chamber 4, adjacent to the point where it opens through one end of the bar, is a transverse passage 9, which opens through the front and rear edges of the bar and has its inner walls straight, while its outer walls are dovetailed, as shown at 10, to receive dovetailed projections 11 upon a key 12, whereby when the key is inserted within said passage it will serve to prevent displacement of the said upper and lower plates 2 and 3 in an obvious manner. This passage is formed by grooves in said upper and lower plates or members and is tapered, and the key 12 tapers correspondingly, so as to always insure a firm seating thereof in said passage-way. The key is held from displacement by a spring-actuated detent 13, which is adapted when the key is inserted to spring up and engage a socket or opening 14, formed in the upper plate 2.

From the foregoing description, taken in connection with the accompanying drawings, the construction, mode of operation, and advantages of the invention will be readily understood, and it will be seen that in order to insert or remove a knife or blade it is simply necessary to press down upon the detent 13 and to force the key forward and out of the passage 10, whereupon the knives or blades may be slid into or out of the slot or passage 4. By this means when a knife becomes dulled and requires sharpening or is broken it may be quickly and conveniently removed and restored to its place or a new knife substituted therefor.

The invention is susceptible of changes in the form, proportion, and minor details of construction within the scope thereof without departing from the spirit or sacrificing any of the advantages of the invention.

Having thus fully described our invention, what we claim as new, and desire to secure by Letters Patent, is—

A cutter-bar comprising upper and lower plates and provided with a longitudinal slot or chamber opening through one end thereof and having a groove at the rear, knives or blades independent of each other and fitted in said slot or chamber and provided with flanges slidably engaging the grooves therein, and a key inserted transversely within the slot or passage to retain the knives in position and having a spring-actuated detent and a socket in the bar to engage said detent, substantially as described.

In testimony whereof we have hereunto set our hands in presence of two subscribing witnesses.

ISAAC N. GRAHAM.
WILLIAM C. CRAIG.
GEO. W. SHINAULT.

Witnesses:
JOHN W. GLENDYE,
N. H. MONTGOMERY.